(12) United States Patent
Tillman et al.

(10) Patent No.: US 7,620,532 B2
(45) Date of Patent: Nov. 17, 2009

(54) OBJECT DISCRETIZATION TO PARTICLES FOR COMPUTER SIMULATION AND ANALYSIS

(75) Inventors: Steven T. Tillman, Huntsville, AL (US); Andrew J. Witzig, Harvest, AL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 741 days.

(21) Appl. No.: 11/336,860

(22) Filed: Jan. 23, 2006

(65) Prior Publication Data

US 2007/0174028 A1    Jul. 26, 2007

(51) Int. Cl.
*G06F 17/50* (2006.01)
*G06C 9/00* (2006.01)

(52) U.S. Cl. .............................. 703/2; 703/7; 702/189; 345/537

(58) Field of Classification Search ............... 703/2, 703/5–9; 702/189; 345/537
See application file for complete search history.

(56) References Cited

U.S. PATENT DOCUMENTS

| | | | |
|---|---|---|---|
| 6,195,625 | B1 | 2/2001 | Day et al. |
| 6,420,698 | B1 * | 7/2002 | Dimsdale ..................... 250/234 |
| 2002/0181751 | A1 * | 12/2002 | Hale ........................ 382/128 |
| 2003/0142100 | A1 * | 7/2003 | Lavelle et al. ............... 345/537 |
| 2004/0006450 | A1 * | 1/2004 | Hale ........................ 702/189 |
| 2004/0034514 | A1 | 2/2004 | Langemyr et al. |
| 2004/0167757 | A1 | 8/2004 | Struijs |

(Continued)

OTHER PUBLICATIONS

PCT International Search Report and Written Opinion in counterpart International Application No. PCT/US07/60683, dated Feb. 27, 2008.

(Continued)

*Primary Examiner*—Thai Phan
(74) *Attorney, Agent, or Firm*—Edell, Shapiro & Finnan, LLC

(57) ABSTRACT

A computer-implemented method is provided for generating data representing an object involved in a computer-implemented simulation of a physical experiment. Data describing geometric dimensions and material for the object is received as input. The data may be broken down into data representing distinct components of the object. Data is generated that describes a base parent volume region that extends at least beyond extents of the geometric dimensions of a portion of the object. Next, data is generated that describes child volume regions produced by subdividing the base parent volume region into the child volume regions each having dimensions that are a fraction of the dimensions of the base parent volume region. The data describing each child volume region is examined to determine whether vertices of each of the child volume regions are in the interior or exterior of the portion. The subdivision and examining process is repeated for each child volume region that is not entirely in the interior or entirely in the exterior of the portion to further subdivide each such child volume region to produce data describing a set of child volume regions that do not satisfy the criteria for further subdivision. Data is generated that uniformly distributes particles at positions of the portion of the object based on dimensions of the child volume region in the set, wherein the data for each particle describes a mass density, velocity, pressure, stress and energy at a position and a collection of the particles represent the object portion for use in the computer-implemented simulation.

35 Claims, 6 Drawing Sheets

U.S. PATENT DOCUMENTS

2004/0186612 A1     9/2004    Edwards et al.
2005/0128195 A1     6/2005    Houston et al.
2006/0235659 A1*    10/2006   Stam .............................. 703/2

OTHER PUBLICATIONS

J. W. Swegle, "An Analysis of Smoothed Particle Hydrodynamics", Mar. 1994, SAND93-2513.

J. J. Monaghan, "Smoothed Particle Hydrodynamics", Annu. Rev. Astron. Astrophys. 1992. 30: 543-74, Publisher: Annual Reviews Inc.

L. B. Lucy, "A Numerical Approach to the Testing of the Fission Hypothesis", Dec. 1977, vol. 82, No. 12, Publisher: The Astronomical Journal.

R. A. Gingold et al., "Smoothed Particle Hydrodynamics: Theory and Application to Non-spherical Stars", Mon. Not. R. astr. Soc. (1977) 181, 375-389, Publisher: Royal Astronomical Society.

* cited by examiner

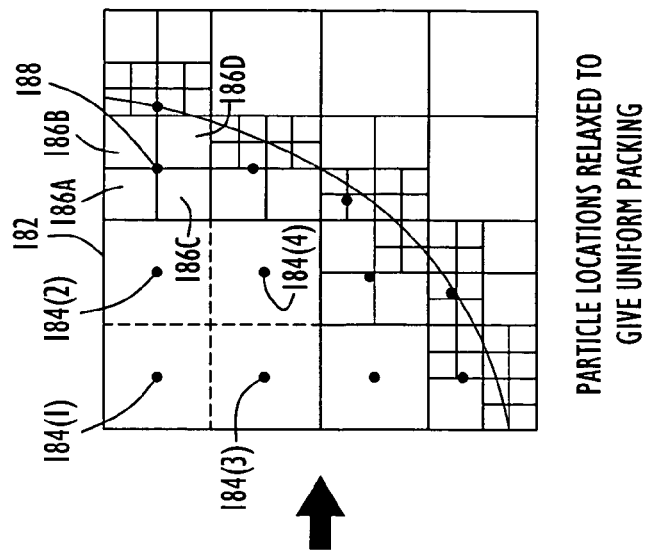
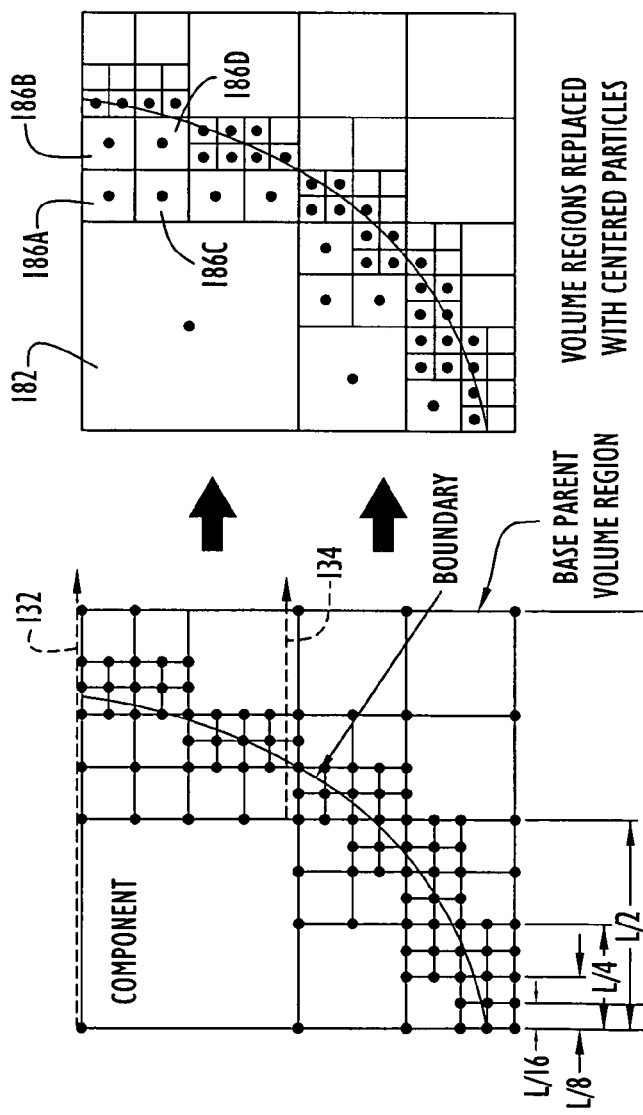

OBJECT DISCRETIZATION TO PARTICLES FOR COMPUTER SIMULATION AND ANALYSIS

FIELD OF THE INVENTION

The present invention relates to computer simulations of physical phenomena, and more particularly to reducing the amount of data representing objects involved in such computer simulations.

BACKGROUND OF THE INVENTION

Computer simulations for experiments involving the impact of one object with another object have widespread applications. For example, automobile manufacturers use such simulations in designing safer vehicles. In a totally different technology field, scientist uses such simulations to study the effectiveness of a missile destroying a moving or stationary target. Regardless of the particular application, it is an overall goal to design a computer simulation that can accurately produce data concerning possible outcomes of the physical phenomena of interest pertaining to two or more objects. However, there is a tradeoff between accuracy and simulation run time. Generally, the more complex a simulation is in order to achieve better accuracy, the longer it takes for that simulation to run to completion. In fact, very complex computer simulations, such as so-called "hydrocodes" can take several days or longer to execute on highly sophisticated models of certain physical events.

Fast-running computer simulations are much more preferred but existing fast computer simulations suffer from lower fidelity and reliability. Nevertheless, faster simulations have the benefit that scientists can make changes to one or more parameters of the simulation, re-run the simulation and quickly see the results with the changed parameters. Thus, it is an ongoing goal in the design of computer simulations to develop estimation techniques that are based to the greatest extent possible in relevant physical processes, have high fidelity yet can run to completion in relatively short intervals of time.

SUMMARY OF THE INVENTION

Briefly, according to the present invention, a computer-implemented method is provided for generating data representing an object involved in a computer-implemented simulation of a physical experiment. Data describing geometric dimensions and material for the object is received as input. The data may be broken down into data representing distinct components or portions of the object. Data is generated that describes a base parent volume region that extends at least beyond extents of the geometric dimensions of a portion of the object. Next, data is generated that describes child volume regions produced by subdividing the base parent volume region into the child volume regions each having dimensions that are a fraction of the dimensions of the base parent volume region. The data describing each child volume region is examined to determine whether vertices of each of the child volume regions are in the interior or exterior of the portion. The subdivision and examining process is repeated for each child volume region that is not entirely in the interior or entirely in the exterior of the portion to further subdivide each such child volume region to produce data describing a set of child volume regions that do not meet the criteria for further subdivision. For any given object geometry, a target number of particles are generated uniformly distributed throughout the object with a desired resolution or density without over-representing the object with particles.

In addition, a technique is provided for determining the orientation of particles representing each of two or more objects involved in an interaction at a point of closest approach of the objects so as to initiate a computer simulation only when the particles of the objects begin to interact with each other.

BRIEF DESCRIPTION OF THE DRAWINGS

FIGS. 4A, 4B and 4C illustrate diagrams of an exemplary object component that is subjected to the discretization algorithm according to the present invention.

DETAILED DESCRIPTION

Figure 1:
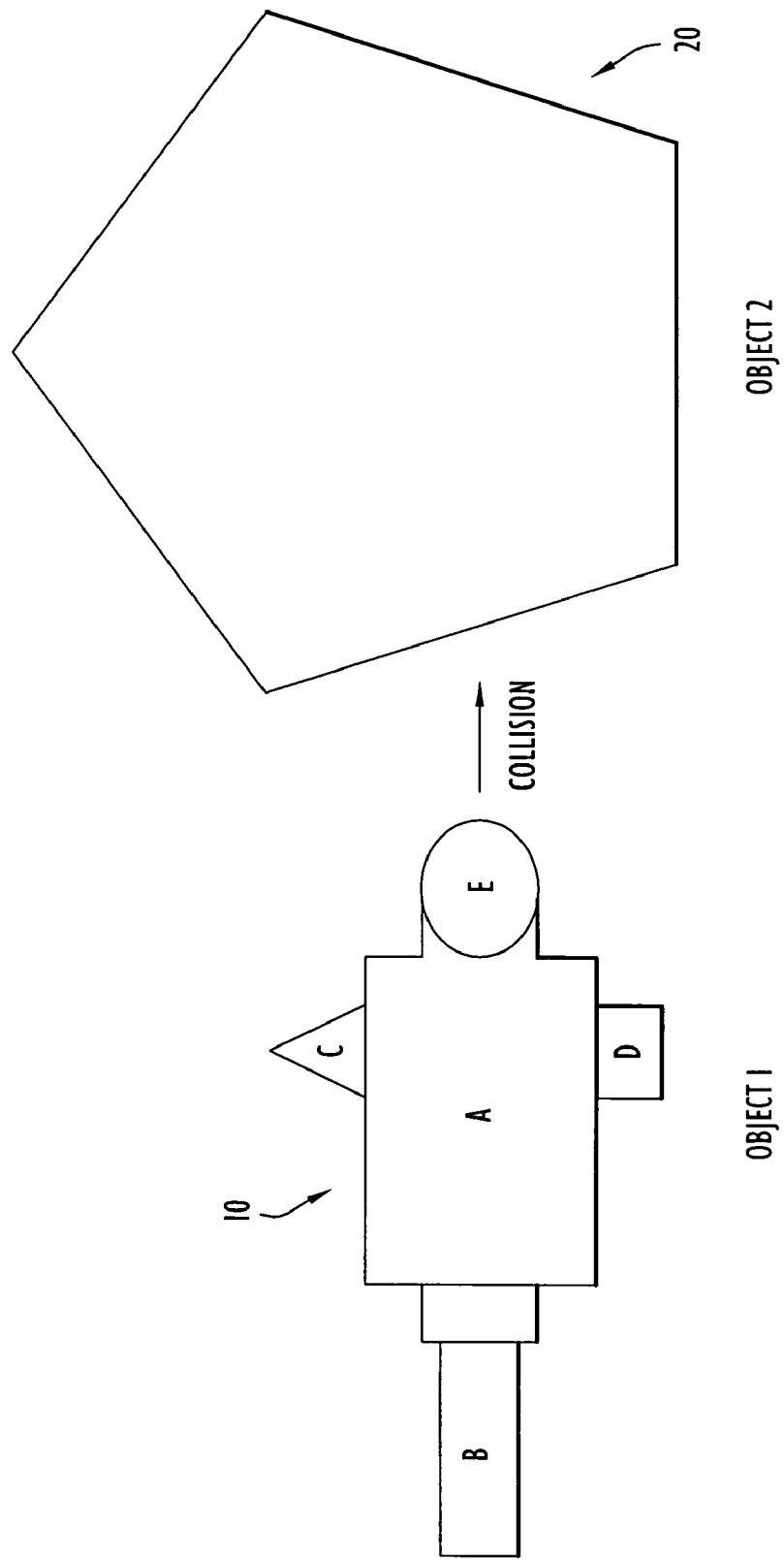
FIG. 1 is a diagram depicting two objects involved in a physical event that is modeled by a computer simulation.

Referring first to FIG. 1, an experiment is depicted in which a first object 10 is to collide with a second object 20. The objects 10 and 20 could be any two objects that may collide with each other, or one of which may explode or detonate near or on the other, etc. Either or both objects may be moving, or one object may be exploding in or near another object. Non-limiting examples of the experiment include: object 20 is stationary (e.g., a building structure) and object 10 is moving and collides or explodes near object 20, where object 10 is a moving vehicle such as a land vehicle, air vehicle (airplane, missile, etc.); object 20 is moving and object 10 is moving and the two objects collide with each other, one of which may or may not set off an explosion upon or near impact, where object 20 is an air vehicle and object 10 is an air vehicle; objects 10 and 20 are both stationary and one explodes inside or near the other object. It should be understood that while only two objects are shown in FIG. 1, the experiment may involve more than two objects.

For these types of experiments, simulation algorithms have been, and are being, developed to predict the possible outcomes of such events using computations that represent the various physical phenomena occurring. Some simulation algorithms use specialized data describing the objects in the experiment. One type of specialized data is data for a collection of "particles" that represent each object, where each particle is defined generally by mass, density, velocity, pressure, stress and energy at a position of the object at a given point in time during the experiment. Computations are then made on each of the particles representing each object using equations describing the physical phenomena occurring during the experiment to ultimately determine possible outcomes. These computations are very complex and can therefore take a significant amount of time to complete throughout time steps of an experiment. Therefore, according to the present invention, techniques are provided to reduce the number of the particles needed to represent each object, thereby reducing the number of computations that need to be made by the simulation algorithms at each time step.

Figure 2:
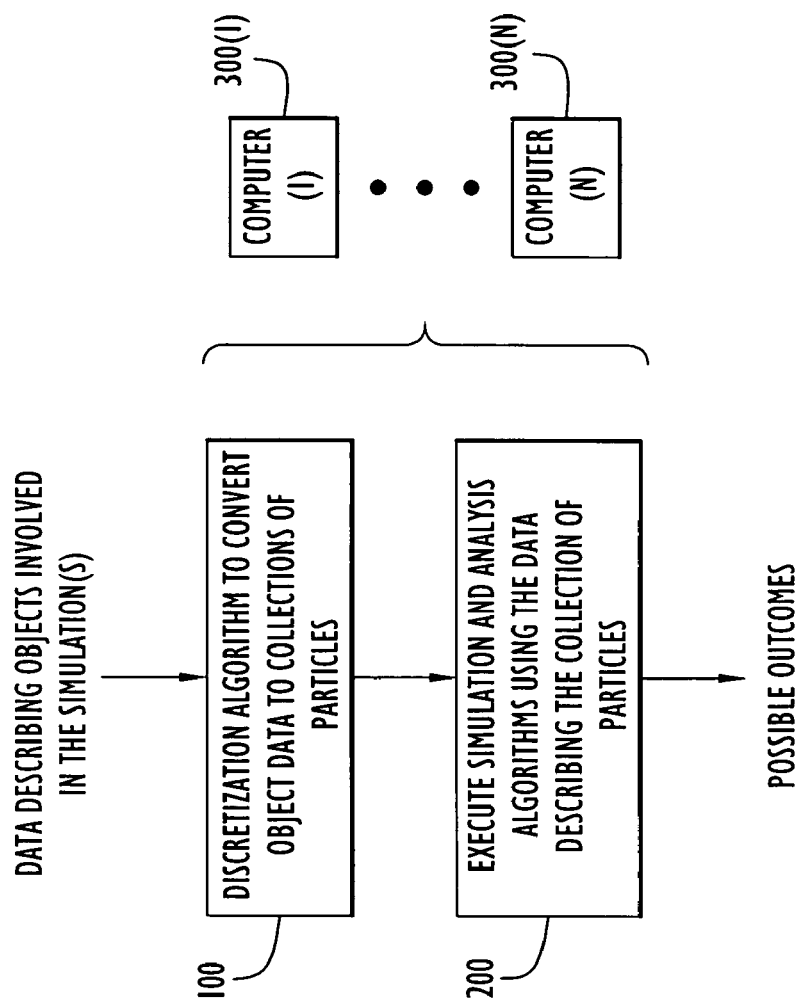
FIG. 2 is a general flow diagram of a computer simulation environment in which an object discretization algorithm according to the present invention is used to supply data to computer simulations.

Turning to FIG. 2, according to the present invention, a discretization algorithm 100 is provided that converts data describing the objects in the experiment to a collection of particles. The output of the discretization algorithm 100 is data describing the collection of particles for each of the objects. This data is supplied as input to one or more simulation processes and/or analysis algorithms to determine possible outcomes of the experiment involving the two objects. These processes are generally represented by reference numeral 200. One or more computers 300(1) to 300(N) may be used to execute the computations required by the discretization process 100 and the various simulation processes 200. The discretization algorithm 100 (and process 200) may be embodied by software, e.g., instructions stored on a computer readable medium that, when executed by a computer, perform the various steps described herein.

One such computer simulation algorithm employs a so-called physics model using smooth particle hydrodynamics (SPH) to approximate variables over finite domains of compact support. SPH is a Lagrangian technique originally formulated to solve astrophysics problems, but has been expanded and enhanced to include material strength effects making the method attractive for hypervelocity impact problems.

SPH does not rely on a traditional grid to quantify node relationships but rather uses interpolation theory to compute smooth field variables at discrete spatial locations throughout the computational domain. Using the theory, the function f at the spatial location, r, may be approximated as:

$$\langle f(r) \rangle = \int f(r_j) W(\vec{r} - \vec{r}_j, h) d\vec{r} \quad (1)$$

where $r_j$ is a new independent variable and W is an appropriate weighting function usually chosen to have the following properties:

$$\int_{-2h}^{2h} W(\vec{r}_i - \vec{r}_j, h) d\vec{r} = 1 \quad (2)$$

$$W(\vec{r}_i - \vec{r}_j, h) = 0 \text{ for } |\vec{r}_i - \vec{r}_j| \geq 2h \quad (3)$$

$$\lim_{h \to 0} [W(\vec{r}_i - \vec{r}_j, h)] = \delta(\vec{r}_i - \vec{r}_j) \quad (4)$$

And where h is a so-called smoothing length that defines the region of compact support known as the Kernel and $\delta$ is the Delta function. The first and second properties ensure compact support while the third property ensures convergence. Although many different functions satisfy the above three properties, one such function is the $3^{rd}$ order B-spline function.

Equation (1) may be converted to a summation if the function, f(r), is only known at discrete points of corresponding volume $(m_j/\rho_j)$ where $m_j$ and $\rho_j$ are the mass and density of interpolation point, j, respectively. Details of the derivation are known in the literature and are not repeated here. The resulting summation is:

$$\langle f(r) \rangle = \sum_{j=1}^{N} \frac{m_j}{\rho_j} f(r_j) W(\vec{r} - \vec{r}_j) d\vec{r} \quad (5)$$

Gradients of the function, f(r), may also be converted to summations. The resulting expression is given below.

$$\nabla \langle f(r) \rangle = \sum_{j=1}^{N} \frac{m_j}{\rho_j} f(r_j) \nabla W(\vec{r} - \vec{r}_j) d\vec{r} \quad (6)$$

Together equations (5) and (6) form the basis of the SPH method and allow the partial differential equations of the Newtonian conservation laws to be transformed into discrete summations of neighboring interpolation points.

These interpolation points are the particles referred to above. At every time step, the density, velocity, and energy of each particle are updated by solving appropriate conservation of mass, momentum, and energy equations. Particle positions are updated by integrating particle velocities over time steps selected to satisfy stability criteria. The conservation laws and the resulting particle relationships employed are provided in Table 1.

TABLE 1

| Property | Governing Relationship | Particle Relationship |
|---|---|---|
| | | Conservation Laws |
| Mass | $\frac{D\rho}{Dt} = -\rho \frac{\partial v^\alpha}{\partial x^\alpha}$ | $\frac{D\rho_i}{Dt} = -\sum_j m_j (v_{ji}^\beta) \frac{\partial W_i}{\partial x^\beta}$ |
| Momentum | $\rho \frac{Dv^\alpha}{Dt} = \frac{\partial \sigma^{\alpha\beta}}{\partial x^\beta}$ | $\frac{Dv_i^\alpha}{Dt} = \sum_j m_j \left( \frac{\sigma_i^{\alpha\beta}}{\rho_i^2} + \frac{\sigma_j^{\alpha\beta}}{\rho_j^2} \right) \frac{\partial W_i}{\partial x^\beta}$ |
| Energy | $\rho \frac{De}{Dt} = -P \frac{\partial v^\alpha}{\partial x^\alpha} + S^{\alpha\beta} \frac{\partial v^\alpha}{\partial x^\beta}$ | $\frac{De_i}{Dt} = -\sum_j \frac{m_j P_j}{\rho_j^2} (v_{ji}^\beta) \frac{\partial W_i}{\partial x^\beta} + \frac{1}{2} \sum_j \frac{m_j S_j^{\alpha\beta}}{\rho_j^2} \left[ (v_{ji}^\alpha) \frac{\partial W_i}{\partial x^\beta} + (v_{ji}^\beta) \frac{\partial W_i}{\partial x^\alpha} \right]$ |
| Position | $\frac{Dx^\alpha}{Dt} = v^\alpha$ | $\frac{Dx_i^\alpha}{Dt} = v_i^\alpha$ | where subscripts i and j refer to individual and neighbor particles, respectively, and $v_{ji}=v_j-v_i$.

The artificial viscosity is included in both the energy and momentum conservation equations. The artificial viscosity contains a bulk viscosity to suppress post-shock velocity oscillations and a Neumann-Richtmeyer viscosity to dissipate shock energy. Weighting functions of the two forms, $\alpha$ and $\beta$, are taken to be unity.

Each particle's sound speed is updated at every time step via the following relationship:

$$C_{s,i}^2 = \left(\frac{\partial P_i}{\partial \rho_i}\right)_s \quad (7)$$

where the partial derivative of pressure with respect to density is evaluated with respect to constant entropy.

The stress tensor, strain rate tensor, rotation rate tensor, constitutive relationship and equation of state employed are listed in Table 2 along with accompanying particle relationships. The time rate of change of the stress deviator tensor is provided via the well known Jaumann rate equation. All materials are assumed to behave elastic-plastic with material failure checked against the von Mises yield criteria. For plastic deformations, an appropriate flow rule is used to relax stresses to the yield surface. The Mie-Gruneisen equation of state relates pressure to material density and internal energy.

is a scheme that is accurate to the order of $(\Delta t)^2$. To help boost run time statistics, the total number of particles in the computational mesh representing the two or more objects is minimized using the algorithm 100 described hereinafter.

Figure 3:
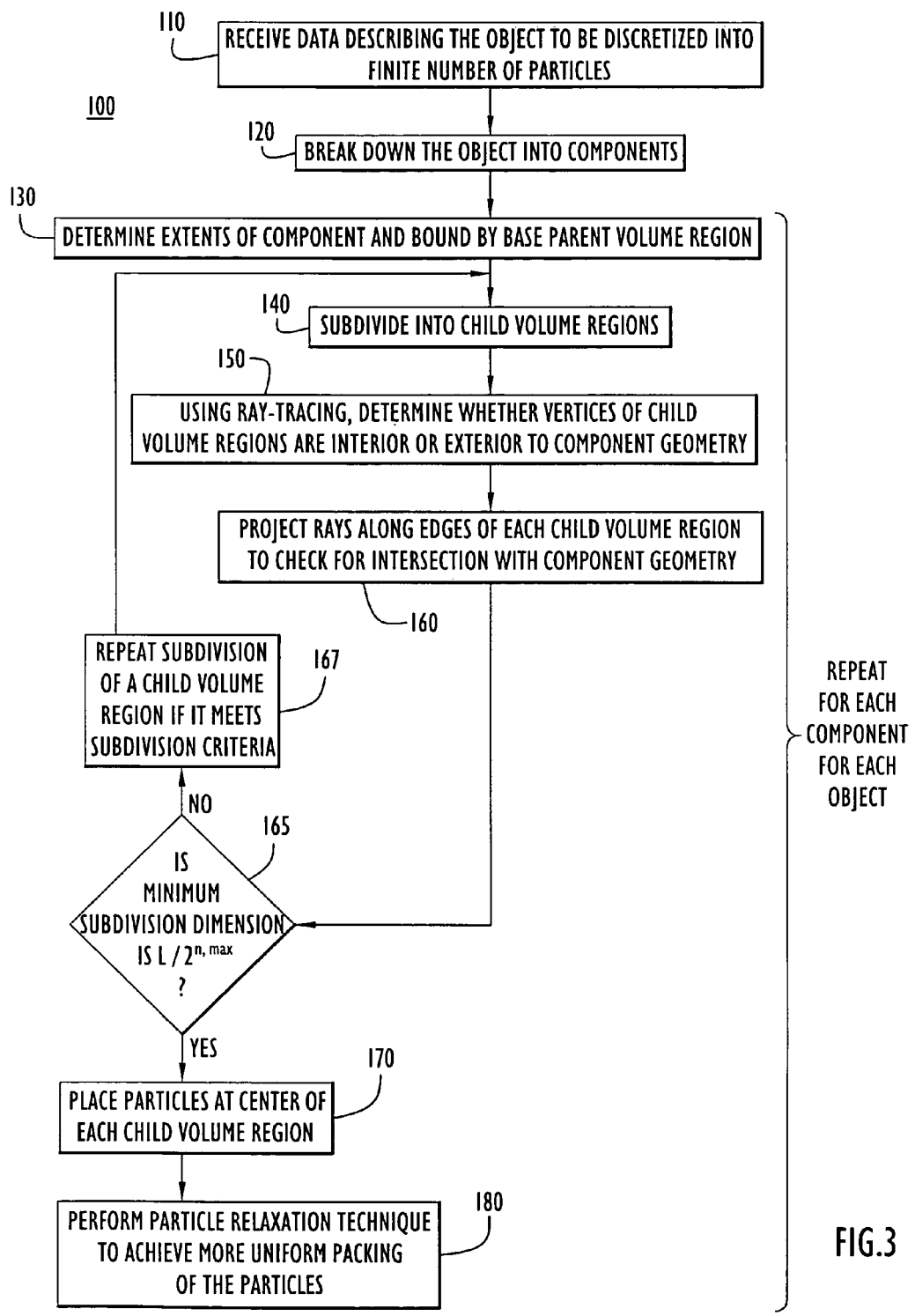
FIG. 3 illustrates a flow chart for the discretization algorithm according to an embodiment of the present invention.

Reference is now made to FIGS. 1, 3 and 4A-4C, for a further description of the discretization process 100. FIG. 3 generally shows the steps associated with the discretization process 100 and FIGS. 4A-4C show how the process 100 is applied to an exemplary portion or component of an object to produce a collection of particles representing that portion of the object.

Initially, in step 110, data is received that describes the object to be discretized into a finite number of particles. This data may consist of computer drawn diagrams (e.g., computer aided drawing, CAD, files) of an object, data describing a set of points and shape of an object, measurement data taken of an object, so-called GIFT geometries of an object, hand drawings of an object, etc. In step 120, the object is broken down into a set of portions or components. Thus, each object component is separately discretized. An object component may be represented by data built from a set of primitive geometries including boxes, circular cylinders, truncated cones, spheres and hemispheres. Shell components may be specified with a component thickness. For example, as shown in FIG. 1, object 10 may have distinct components A, B, C, D and E. Each object component may have different geometries and/or may be made of different material(s).

TABLE 2

Constitutive Relationships and Equation of State

| Property | Governing Relationship | Particle Relationship |
|---|---|---|
| Stress Tensor | $\sigma^{\alpha\beta} = S^{\alpha\beta} - \delta^{\alpha\beta} P$ | $\sigma_i^{\alpha\beta} = S_i^{\alpha\beta} - \delta^{\alpha\beta} P_i$ |
| Strain Rate Tensor | $d^{\alpha\beta} = \frac{1}{2}\left(\frac{dv^\alpha}{dx^\beta} + \frac{dv^\beta}{dx^\alpha}\right)$ | $d_i^{\alpha\beta} = \frac{1}{2}\sum_j \frac{m_j}{\rho_j}\left[(v_{ji}^\alpha)\frac{\partial W_i}{\partial x^\beta} + (v_{ji}^\beta)\frac{\partial W_i}{\partial x^\alpha}\right]$ |
| Rotation Rate Tensor | $R^{\alpha\beta} = \frac{1}{2}\left(\frac{dv^\alpha}{dx^\beta} - \frac{dv^\beta}{dx^\alpha}\right)$ | $R_i^{\alpha\beta} = \frac{1}{2}\sum_j \frac{m_j}{\rho_j}\left[(v_{ji}^\alpha)\frac{\partial W_i}{\partial x^\beta} - (v_{ji}^\beta)\frac{\partial W_i}{\partial x^\alpha}\right]$ |
| Constitutive Relationship | $\sigma^{\alpha\beta,\nabla} = \frac{D}{Dt}\sigma^{\alpha\beta} + R^{k\alpha}\sigma^{k\beta} + R^{r\beta}\sigma^{\alpha r}$ | $\frac{dS_i^{\alpha\beta}}{dt} = 2G\left(d_i^{\alpha\beta} - \frac{1}{3}\delta^{\alpha\beta}d_i^{kk}\right) + R_i^{\alpha k}S_i^{k\beta} + R_i^{\beta r}S_i^{\alpha r}$ |
| Equation of State | $P = P_H\left(1 - \frac{\Gamma_0}{2}\eta\right) + \Gamma_0\rho_0 e$ | $P_i = P_{H,i}\left(1 - \frac{\Gamma_{0,i}}{2}\eta_i\right) + \Gamma_{0,i}\rho_{0,i}e_i$ | where $P_H$ refers to the Hugoniot pressure and $\eta$ is the compression ratio $(1-\rho_0/\rho)$.

Numerical stability is assured by satisfaction of the Courant condition. One technique selects appropriate time steps based on the minimum ratio of smoothing length to sound speed, smoothing length to particle velocity, and square root of the ratio of smoothing length to particle acceleration for all particles within the computational domain at every time step.

$$\Delta t = \sum_{i=1}^{N} \min\left[\left(\frac{h_i}{C_{s,i}}\right), \left(\frac{h_i}{v_i}\right), \sqrt{\frac{h_i}{a_i}}\right] \quad (8)$$

Any number of schemes known in the art may be used for integrating the system of equations. However, one technique Steps 130-180 are performed for each component of an object. Steps 130-180 are now described with reference to FIGS. 4A, 4B and 4C. FIGS. 4A, 4B and 4C are two-dimensional representations of the process, and it should be understood that the process is actually performed in three dimensions, where squares shown in the figures are actually cube-shaped volume regions in three dimensions, but are shown as squares for simplicity.

In step 130, the extents of the component are bounded by a base parent volume region. For example, the base parent volume region has a parallelepiped shape, such as a cube, of dimension, L. Next, in step 140, the base "parent" volume region is subdivided into four "child" volume regions having dimensions that are a fraction, e.g., one half, of the dimensions (in each direction) of the base parent volume region, L/2, e.g., ⅛ of the volume of the base parent volume region in the case of a cube shaped volume region. It should be understood that the volume regions may be parallelepipeds (cubes), but need not be, and the subdivision process need not be equal in each direction. Other geometries of these volume regions may be used.

In step 150, using a ray-tracing technique, a determination is made whether the vertices of the child volume regions are found to be either interior or exterior to the component geometry. Reference numeral 132 shows a ray projected from a vertex of the base parent volume region. Additionally, in step 160 rays are projected along the edges of each child volume region to check for an intersection with the component geometry. Reference numeral 134 shows a ray projected from a vertex of one of the child volume regions of the base parent volume region.

As shown at steps 165 and 167, the subdivision and ray tracing process of steps 140-160 are then repeated for child volume regions unless a minimum subdivision dimension had been reached. In particular, in step 167, the data for a child volume region is examined to determine whether its vertices are entirely in the interior or entirely in exterior of the component. Steps 140-160 are repeated to further subdivide a child volume region if the child volume region satisfies a subdivision criteria defined as: (a) at least one but not all of its vertices of the child volume region are inside the component geometry, or (b) at least one edge of the child volume region crosses a component boundary. Said another way, a child volume region is further subdivided unless (a) the child volume region is entirely in the interior of the component geometry, (b) the child volume region is entirely on the exterior of the component geometry, or (c) the minimum subdivision dimension is reached. When a child volume region is subdivided it becomes a parent to four more child volume regions with dimension (in each direction in the case of a cube-shaped volume region) of $L/2^{n+1}$. As shown at step 165, further subdivision of child volume regions continues until a minimum subdivision-dimension (in each direction in the case of a cube-shaped volume region) of $L/2^{n_{max}}$, for example, is reached. Other minimum subdivision dimensions may be chosen. In the example of FIG. 4A, $n_{max}=4$, which provides a child cube-shaped volume region edge length of $L/16$. Thus, no child volume regions are created that are smaller than $L/16$. Steps 140-160 produce a set of child volume regions that do not meet the subdivision criteria for further subdivision, as shown in FIG. 4A.

After the subdivision process of steps 140-160, particles are placed at the center of each child volume region (a volume region that has at least one vertex within the component geometry) in step 170 as shown in FIG. 4B. The particle mass is assumed to vary linearly with respect to the number of vertices interior to the component as represented by equation (9).

$$m_i \approx \rho_i L_i^3 \frac{N_{v,i}}{8} \quad (9)$$

where $m_i$ is the mass of particle i, $\rho_i$ is the density of particle i, $L_i$ is the bounding volume region edge length, and $N_{v,i}$ is number of interior vertices of child volume region i. This method produces an error in component mass of the order of $1/n_{max}^3$.

Due to the subdivision methodology, the majority of the particles are concentrated on the component boundary, which is undesirable. In step 180, to provide more uniform packing of particles, the edge length, $L_i$, of each child volume region achieved after step 165, is compared to a relaxation edge length, $L_{rel}$, a reference value. If $L_i$ is larger than $L_{rel}$, the child volume region is subdivided into further child volume regions and four smaller particles are placed within each of the resulting, or further, child volume regions. For example, when $L_{rel}=L/4$, the dimension of the cube-shaped volume region 182 is $L/2$ which is greater than $L_{rel}$. Thus, the cube-shaped volume region 182 is further subdivided as shown by the dotted lines and four smaller particles are placed at the center of the resulting child cube-shaped volume regions as shown at reference numerals 184(1) to 184(4).

Conversely, when the dimension $L_i$ for a child volume region is less than or equal to the reference value $L_{rel}$, one particle with a mass equal to the sum of the mass of all the particles in those bounding volume regions is placed in the parent volume region corresponding to those child volume regions, of dimension, $L_{rel}$. Furthermore, the spatial position of the resulting particle is determined by mass weighting the positions of all the particles in the corresponding child volume regions so that the position of the resulting particle will be closer to the child volume region having a greater mass particle. For the particles shown in the example of FIG. 4C, $L_{rel}=L/4$ and $n_{max}=4$. For example, when $L_{rel}=L/4$, the cube-shaped volume regions 186A, 186B, 186C and 186D each have a dimension of $L/8$ which is less than $L_{rel}$. Therefore, as shown in FIG. 4C, one particle 188 is placed in the parent cube-shaped volume region with respect to the cube-shaped volume regions 186A, 186B, 186C and 186D. The mass of the resulting particle 188 is equal to the sum of the masses of the particles at the center of cube-shaped volume regions 186A, 186B, 186C and 186D shown in FIG. 4B. The position of particle 188 depends on the mass of particles 186A-186D.

At the beginning of the object discretization process 100, there is a target number of particles to be generated in order to represent a particular object component. This target number depends on the volume of the object component and a global particle density variable, $\rho_{par}$, that has units of particles/cm$^3$, such that the target number=$\rho_{par}$×object component volume. The global particle density variable is user-defined and is set to the same value across all object components; it determines the number of particles generated to represent each object component, a so-called "resolution" of the system. If the number of particles within the component is less than the target number, the process 100 is repeated with a larger base parent volume region or with a smaller minimum subdivision level. The process 100 is iterated again with the larger base parent volume region or smaller minimum subdivision level until the number of particles within the component is close to the target number by a predetermined amount. The subdivision methodology described above and shown in FIGS. 4A, 4B and 4C achieves an optimum balance between having too few particles and too many particles defining the objects in the experiment to be modeled.

When supplied as input data to the processing algorithms 200, each particle may have an initial velocity (and thus some initial kinetic energy) if that object is moving for the experiment, but all other parameters for the particle will be zero (pressure, stress, etc.). In addition, since the material for each component of the object is assumed to be known, the volume of the object can be computed from the discretization process 100, and the density of the material is known, then the overall mass of that component can be computed.

The object discretization methods described herein may be useful in a variety of application including, without limitation, vehicle impact studies (cars, planes, etc.) for safety analysis, explosion analysis in building structures, and target destruction analysis (air, land, sea, space).

Figure 5:
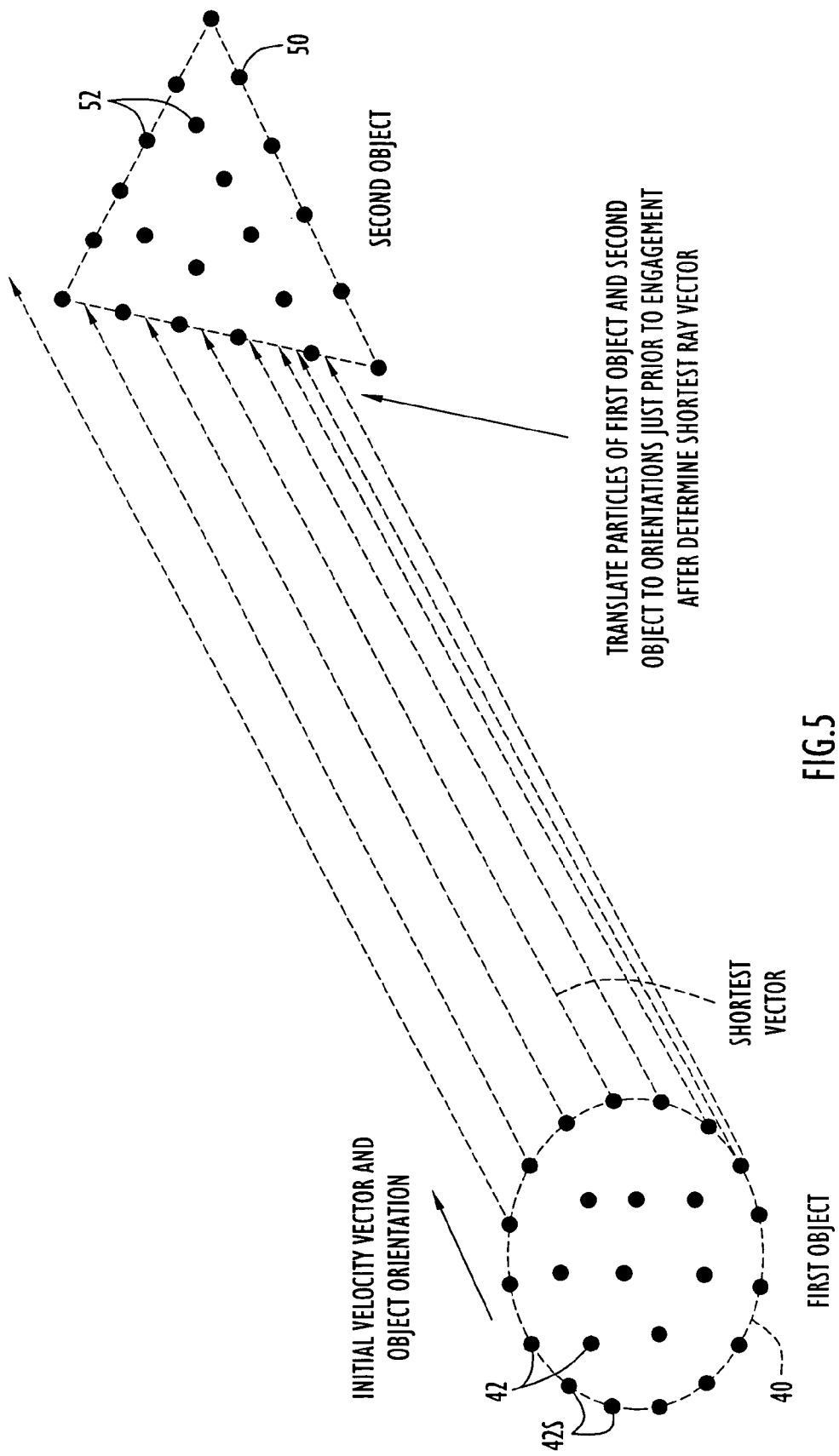
FIG. 5 is a diagram depicting how point of closest approach is determined between two objects in a computer simulation, according to a further aspect of the invention.

Before a computer simulation 200 is initiated using the collection of particles for the objects involved, a technique may be executed to determine a point of closest approach between the objects. Specifically, it is desirable to start the computer simulation of the interaction of two or more objects at an instant in time just before the interaction begins, rather than when the objects are on a trajectory for the interaction but are nevertheless far apart and not interacting with each other. This saves a considerable amount of time in the overall simulation. The computer simulation is started when the interaction begins, that is, when it is interesting. Reference is made to FIG. 5 in which a simplified example is shown involving a first object 40 and a second object 50. In this example, the first object 40 is moving rapidly relative to the second object 50 towards a desired impact or engagement with the second object 50. Using the discretization techniques described in conjunction with FIGS. 1-4C, data for a collection of particles 42 are generated for object 40 and data for a collection of particles 52 are generated for object 50. The geometric boundaries of the surfaces of each of the objects are shown by the dotted line around its corresponding collection of particles. It is desirable to determine the orientations of the collections of particles at the instant the objects engage or impact each other given some initial velocity vectors and orientations for the objects. In this way, the computer simulation concerning the impact of the objects can be initiated from the point of closest approach, or the instant just prior to impact.

Figure 6:
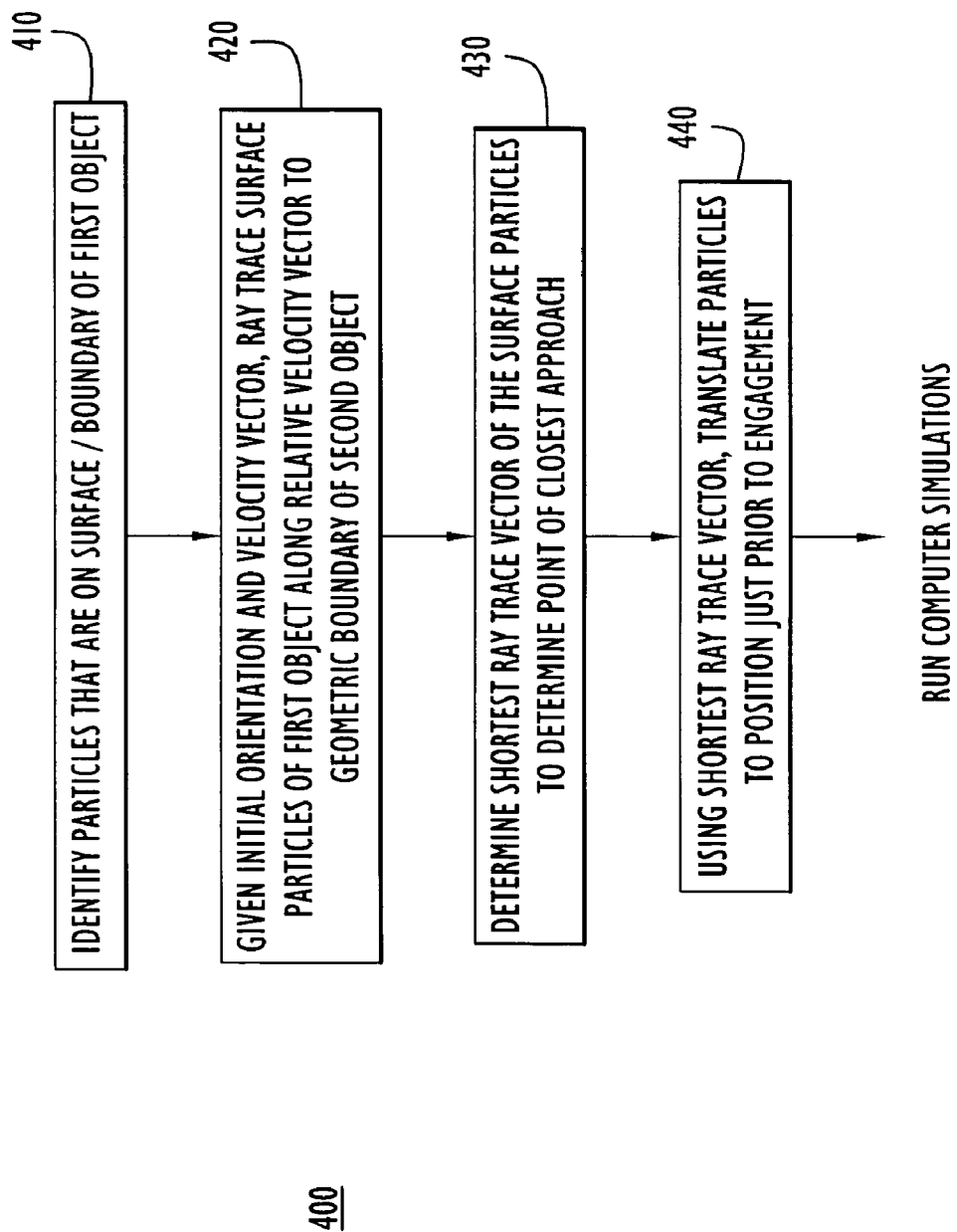
FIG. 6 is a flow chart showing a procedure for determining the point of closest approach according to an embodiment of the invention.

Turning to FIG. 6, a procedure 400 is described for determining the point of closest of approach. After the discretization process 100 is complete for the object, in step 410, the data for the collection of particles for the objects 40 and 50 is examined to identify those particles that represent or are at positioned on the geometric boundaries or surfaces of the respect objects. In the case of object 40, these particles are labeled 42S. Next, in step 420, given initial orientations and velocity vectors of the objects, the surface particles of object 40 are ray-traced along the relatively velocity vector of object 40 to the geometric boundary of object 50. This ray tracing is performed only for the surface particles 42S of object 40 to the geometric boundary of object 50, not for the other particles residing in the interior of object 40.

Next, in step 430, from the ray traced vectors determined in step 420 for the surface particles 42S of object 40, the shortest ray trace vector is determined. For example, in the example of FIG. 5, the shortest ray trace vector is the one indicated. Next, in step 440, using the shortest ray trace vector, the particles for object 40 can be translated (e.g., moved in space) to the point of closest approach to object 50 thereby determining the proper orientation of all of the particles of object 40 with respect to all of the particles of object 50 at the point of closest approach. It is from this point that the computer simulations 200 (FIG. 2) are executed to analyze the outcomes of the engagement of the two objects.

The process 400 shown in FIG. 6 is beneficial because it is not necessary to run the computer simulation when the objects are relatively far apart and the particles representing the objects are not interacting with each other. The precise orientation of the particles of one object relative to the particles of the other object(s) at the closest approach just prior to interaction of the particles is determined and the simulation is initiated at that point, saving a significant amount of time for running the simulation.

The system and methods described herein may be embodied in other specific forms without departing from the spirit or essential characteristics thereof. The foregoing embodiments are therefore to be considered in all respects illustrative and not meant to be limiting.

What is claimed is:

1. A computer-implemented method for generating data representing an object involved in a computer-implemented simulation of a physical experiment, comprising:
   a. receiving as input data describing physical characteristics of the object, said physical characteristics including geometric dimensions for components of the object;
   b. for a component of the object, generating data describing a base parent volume region that that extends at least beyond extents of the geometric dimensions of the component;
   c. generating data describing child volume regions produced by subdividing said base parent volume region into the child volume regions each having dimensions that are a fraction of the dimensions of the base parent volume region;
   d. examining the data describing each child volume region to determine whether vertices of each of the child volume regions are in the interior or exterior of the component;
   e. repeating (c) and (d) for each child volume that is not entirely in the interior or entirely in the exterior of the component to further subdivide each such child volume in order to produce data describing a set of child volume regions that do not meet the criteria for further subdivision;
   f. generating data for a particle positioned at a center of each child volume region in said set, wherein the data for each particle describes a mass density, velocity, pressure, stress and energy at a position of the component; and
   g. generating data that, based on dimensions of the child volume regions in said set, uniformly arranges the particles at positions to represent the component for use in the computer-implemented simulation.

2. The method of claim 1, wherein (g) comprises: (i) comparing a dimension of a child volume region in said set with a reference value; (ii) when a dimension of the child volume region is greater than the reference value, generating data describing further child volume regions for the child volume region produced by subdividing the child volume region into further child volume regions having dimensions that are a fraction of the dimensions of the child volume region and generating data describing a particle within each of the further child volume regions resulting from subdividing the child volume region; and (iii) when a dimension of the child volume region in said set is less than or equal to the reference value, generating data describing a particle at a position within a parent volume region with respect to the child volume region.

3. The method of claim 2, wherein (g)(iii) further comprises generating data describing a position of the particle in the parent volume region based on a mass of each of the particles in the corresponding child volume regions having a dimension less than the reference value and wherein the mass of said particle in the parent volume region is equal to the sum of the mass of each of the particles in the corresponding child volume regions.

4. The method of claim 1, and further comprising comparing a number of particles resulting from (c)-(g) with a value that is based on a volume of the component and a global particle density.

5. The method of claim 4, wherein (e) further comprises determining whether a dimension of a child volume region has reached a minimum subdivision dimension and if so steps (c) and (d) are not performed to further subdivide a child volume region.

6. The method of claim 5, wherein (b) through (g) are repeated with a larger base parent volume region when the number of particles differs from said value by more than a predetermined amount.

7. The method of claim 5, wherein (b) through (g) are repeated with a smaller minimum subdivision dimension when the number of particles differs from said value by more than a predetermined amount.

8. The method of claim 1, wherein (b) through (g) are repeated for each component of the object.

9. The method of claim 1, wherein the base parent volume region comprises a parallelepiped shape, and wherein the child volume regions subdivided from the base parent volume region comprise a parallelepiped shape.

10. The method of claim 9, wherein the base parent volume region comprises a cube shape, and wherein the child volume regions subdivided from the base parent volume regions comprise a cube shape.

11. The method of claim 10, wherein (c) generating comprises generating data describing the child volume regions by subdividing the base parent volume region into child volume regions having dimensions that are half of the dimensions in each direction of the base parent volume region.

12. The method of claim 1, wherein receiving comprises receiving data describing characteristics of object components built from a set of primitive geometries.

13. The method of claim 1, and further comprising repeating (a)-(g) for each of at least first and second objects to produce a first collection of particles representing the first object and a second collection of particles representing the second object; and determining an orientation of the first collection of particles relative to the second collection of particles at a point of closest approach of the first and second objects given an initial orientation and velocity of each of the first and second objects.

14. The method of claim 13, wherein determining an orientation comprises: identifying among the first collection of particles those particles that are on a geometric boundary of the first object; ray tracing the surface particles identified among the first collection of particles to the geometric boundary of the second object based on said initial orientation and velocity of each of the first and second objects to produce a plurality of ray trace vectors; determining, among the ray trace vectors generated from said ray tracing, the shortest ray trace vector; and generating data that represents an orientation of the first collection of particles relative to the second collection of particles at the point of closest approach by translating the first collection of particles to a position relative to the second collection of particles based on the shortest ray trace vector.

15. A computer-implemented method for generating data representing an object involved in a computer-implemented simulation of a physical experiment, comprising:
 a. generating, from data describing geometric dimensions and material for the object, data describing a base parent volume region that extends at least beyond extents of the geometric dimensions of a portion of the object;
 b. generating data describing child volume regions produced by subdividing said base parent volume region into the child volume region each having dimensions that are a fraction of the dimensions of the base parent volume region;
 c. examining the data describing each child volume region to determine whether vertices of each of the child volume region are in the interior or exterior of the portion;
 d. repeating (b) and (c) for each child volume region that is not entirely in the interior or entirely in the exterior of the portion to further subdivide each such child volume region in order to produce data describing a set of child volume regions that do not meet the criteria for further subdivision; and
 e. generating data that uniformly distributes particles at positions of the portion of the object based on dimensions of the child volume regions in said set, wherein the data for each particle describes a mass density, velocity, pressure, stress and energy at a position to represent the portion of the object for use in the computer-implemented simulation.

16. The method of claim 15, wherein (e) generating further comprises generating data for a particle positioned at a center of each child volume region in said set, and redistributing the particles based on dimensions of the child volume regions in said set.

17. The method of claim 16, wherein (e) comprises: (i) comparing a dimension of a child volume region in said set with a reference value; (ii) when the dimension of the child volume region is greater than the reference value, generating data describing further child volume regions produced by subdividing the child volume region into further child volume regions having dimensions that are a fraction of the dimensions of the child volume region and generating data describing a particle within each of the further child volume regions resulting from subdividing the child volume region; and (iii) when a dimension of the child volume region is less than or equal to the reference value, generating data describing a particle at a position within a parent volume region with respect to the child volume region.

18. The method of claim 17, wherein (e)(iii) further comprises generating data describing a position of the particle in the parent volume region based on a mass of each of the particles in the corresponding child volume region having a dimension less than the reference value and wherein the mass of said particle in the parent volume region is equal to the sum of the mass of each of the particles in the corresponding child volume region.

19. The method of claim 15, and further comprising comparing a number of particles resulting from (b)-(e) with a value that is based on a volume of the component and a global particle density.

20. The method of claim 19, wherein (c) further comprises determining whether a dimension of a child volume region has reached a minimum subdivision dimension and if so (b) is not performed to further subdivide a child volume region.

21. The method of claim 20, wherein (a) through (e) are repeated with a larger base parent volume region when the number of particles differs from said value by more than a predetermined amount.

22. The method of claim 20, wherein (a) through (e) are repeated with a smaller minimum subdivision dimension when the number of particles differs from said value by more than a predetermined amount.

23. The method of claim 15, wherein (a) through (e) are repeated for each portion of the object.

24. The method of claim 15, wherein the base parent volume region comprises a parallelepiped shape, and wherein the child volume regions subdivided from the base parent volume region comprise a parallelepiped shape.

25. The method of claim 24, wherein the base parent volume region comprises a cube shape, and wherein the child volume regions subdivided from the base parent volume regions comprise a cube shape.

26. A computer-readable medium storing instructions that, when executed by a computer, cause the computer to:
   a. receive as input data describing physical characteristics of the object, said physical characteristics including geometric dimensions for components of the object;
   b. for a component of the object, generate data describing a base parent volume region that extends at least beyond extents of the geometric dimensions of the component;
   c. generate data describing child volume regions produced by subdividing said base parent volume region into the child volume regions each having dimensions that are a fraction of the dimensions of the base parent volume region;
   d. examine the data describing each child volume region to determine whether vertices of each of the child volume regions are in the interior or exterior of the component;
   e. repeat (b)-(d) for each child volume region that is not entirely in the interior or entirely in the exterior of the component to further divide each such child volume region in order to produce data describing a set of child volume regions that do not satisfy the criteria for further subdivision;
   f. generate data for a particle positioned at a center of each child volume region in the set, wherein the data for each particle describes a mass density, velocity, pressure, stress and energy at a position of the component; and
   g. generate data that, based on dimensions of the child volume regions in said set, uniformly arranges the particles at positions to represent the component for use in the computer-implemented simulation.

27. The computer-readable medium of claim 26, wherein the instructions that cause the computer to (g) generate data that uniformly arranges comprises instructions that cause the computer to generate data for a particle positioned at a center of each child volume region in said set, and redistributing the particles based on dimensions of the child volume regions in said set.

28. The computer-readable medium of claim 27, wherein the instructions that cause the computer to (g) generate comprise instructions that cause the computer to (i) compare a dimension of a child volume region in said set with a reference value; (ii) when the dimension of the child volume region is greater than the reference value, generate data describing further child volume regions produced by subdividing the child volume region into further child volume regions having dimensions that are a fraction of the dimensions of the child volume region and generating data describing a particle within each of the further child volume regions resulting from subdividing the child volume region; and (iii) when a dimension of the child volume region is less than or equal to the reference value, generate data describing a particle at a position within a parent volume region with respect to the child volume region.

29. The computer-readable medium of claim 28, wherein the instructions that cause the computer to (g)(iii) generate data comprise instructions that cause the computer to generate data describing a position of the particle in the parent volume region based on a mass of each of the particles in the corresponding child volume region having a dimension less than the reference value and wherein the mass of said particle in the parent volume region is equal to the sum of the mass of each of the particles in the corresponding child volume region.

30. The computer-readable medium of claim 26, and further comprising instructions that cause the computer to compare a number of particles resulting from functions (b)-(e) with a value that is based on a volume of the component and a global particle density.

31. The computer-readable medium of claim 30, wherein the instructions that cause the computer to (d) examine further comprise instructions that cause the computer to determine whether a dimension of a child volume region has reached a minimum subdivision dimension and if so (b) is not performed to further subdivide a child volume region.

32. The computer-readable medium of claim 31, wherein the instructions for functions (a)-(g) are repeated with a larger base parent volume region when the number of particles differs from said value by more than a predetermined amount.

33. The computer-readable medium of claim 31, wherein the instructions for functions (a)-(g) are repeated with a smaller minimum subdivision dimension when the number of particles differs from said value by more than a predetermined amount.

34. The computer-readable medium of claim 26, wherein the instructions that cause the computer to (g) generate comprise instructions that cause the computer generate data for the base volume region such that it comprises a cube shape, and wherein the child volume regions subdivided from the base parent volume regions comprise a cube shape.

35. A computer-implemented method for generating data representing engagement of at least two objects, comprising:
   a. generating data describing particles that represent each of first and second objects from geometric data for the first and second objects, wherein the data for each particle describes a mass density, velocity and energy at a position of the corresponding object, to produce a first collection of particles representing the first object and a second collection of particles representing the second object; and
   b. determining an orientation of the first collection of particles relative to the second collection of particles at a point of closest approach of the first and second objects given an initial orientation and velocity of each of the first and second objects, wherein determining comprises identifying among the first collection of particles those particles that are on a geometric boundary of the first object; ray tracing the surface particles identified among the first collection of particles to the geometric boundary of the second object based on said initial orientation and velocity of each of the first and second objects to produce a plurality of ray trace vectors; determining, among the ray trace vectors generated from said ray tracing, the shortest ray trace vector; and generating data that represents an orientation of the first collection of particles relative to the second collection of particles at the point of closest approach by translating the first collection of particles to a position relative to the second collection of particles based on the shortest ray trace vector.

* * * * *